United States Patent [19]

Chun

[11] Patent Number: 4,654,855
[45] Date of Patent: Mar. 31, 1987

[54] PULSED GAS LASER USING ACOUSTIC DIODES FOR CIRCULATION OF THE GAS

[75] Inventor: Kang R. Chun, Pacific Palisades, Calif.

[73] Assignee: Northrop Corporation, Hawthorne, Calif.

[21] Appl. No.: 720,465

[22] Filed: Apr. 5, 1985

[51] Int. Cl.$^4$ .............................................. H01S 3/22
[52] U.S. Cl. ...................................... 372/58; 372/55; 372/33
[58] Field of Search ............................. 372/58, 55, 33

[56] References Cited
U.S. PATENT DOCUMENTS 4,283,686 8/1981 Daugherty et al. .................. 372/58

Primary Examiner—Leon Scott, Jr.
Attorney, Agent, or Firm—Terry J. Anderson; Robert B. Block

[57] ABSTRACT

A pulsed electrical discharge gas laser uses acoustic diodes to cause the gas to circulate between the active region of the laser and a gas heat exchanger. The diodes take the form of asymmetrical obstacles placed within the gas flow exhibit asymmetrical resistance to the passage of compression waves in the gas that are generated by the electrical discharge and, as a consequence, cause a net flow of gas in one direction through the obstacles, thus causing the gas to circulate from the active region of the laser through the gas heat exchanger and return. A series of columns having cup-shaped cross sections act as the acoustic diodes.

4 Claims, 5 Drawing Figures

PULSED GAS LASER USING ACOUSTIC DIODES FOR CIRCULATION OF THE GAS

BACKGROUND OF THE INVENTION

1. Field of the Invention

This invention pertains to pulsed gas lasers. More particularly, this invention pertains to means for circulating the gas within a pulsed gas laser.

2. Description of the Prior Art

One method for pumping a pulse discharge gas laser is periodically to discharge electric current through the active volume of gas to excite the gaseous atoms and molecules to the levels appropriate for lasing action. For repetitive operation of the pulse discharge laser, the gas within the active region normally is replaced between discharges. In the typical device, the gas which has been removed from the active region of the laser then passes through a heat exchanger where it is cooled and then, recirculates through the active region. In the prior art, fans have been used to cause the gas to flow in a circulatory manner out of the discharge region through the heat exchanger and back into the discharge region. In applications where extreme reliability of operation of the laser is required, e.g. for operation while in orbit about the earth, a fan with its moving parts, however, is unsuitable. Accordingly, in such applications, means must be found for circulating the gas which do not have moving parts.

U.S. Pat. No. 4,360,922 describes a "Pressure Wave Charged Repetitively Pulsed Gas Laser", invented by Vijay A. Kulkarny, ("Kulkarny"), which invention uses mechanical shutters which are opened and closed in coordination with pressure waves within the gas to cause the gas to circulate within the system. Although the Kulkarny device avoids the use of fans, the mechanical operation of the high speed shutters requires moving parts which impair the reliability of the system.

SUMMARY OF THE INVENTION

This invention uses "acoustic obstacles" to circulate the gas in the pulse discharge gas laser. The acoustic diodes consist of passive mechanical diodes located within the gas filled chamber of the laser, which obstacles exhibit an asymmetrical resistance to the passage of the compression wave generated by the discharge of electrical current through the gas. Because the obstacles exhibit less resistance to the passage of the compression wave in one direction as compared to the opposite direction, the obstacles cause a net flow of gas to occur in the direction of lesser resistance. As a consequence, the acoustic diodes interact with the compression waves to circulate the gas through the interior of the laser. The acoustic diodes have no moving parts and thus exhibit the desired high reliability.

DESCRIPTION OF THE PREFERRED EMBODIMENT

Figure 1A:
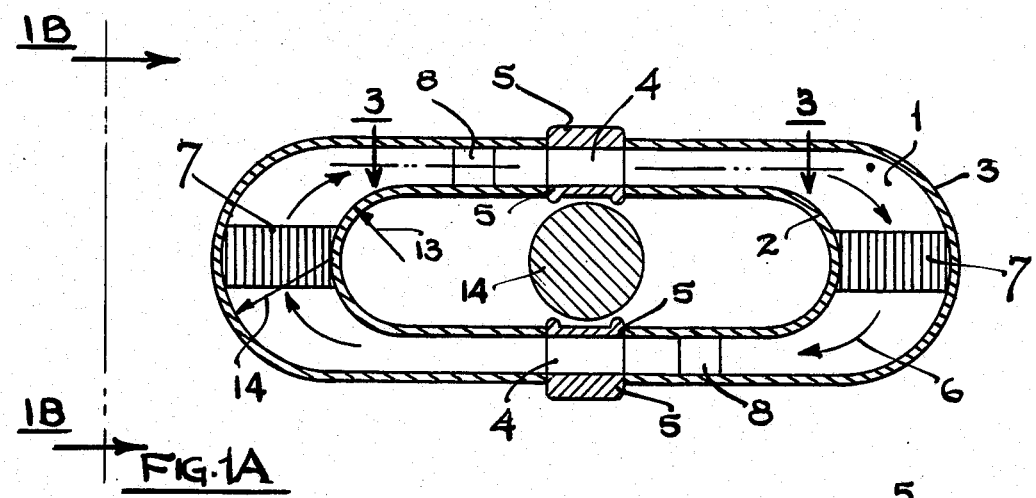
FIG. 1A is a front view of a cross section of the device.
Figure 1B:
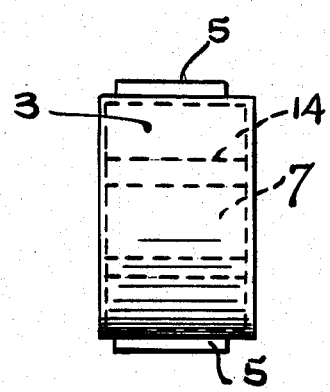
FIG. 1B is a side view of the device.

FIG. 1 depicts a cross-sectional view of the pulse discharge laser. A gas 1 is contained within the volume enclosed by interior wall 2 and exterior wall 3 of the laser. The portions of the gas located within the active regions 4 of the laser are excited by an electrical current discharged in a pulsed manner between pairs of electrodes 5. Although two discharge regions are depicted in the preferred embodiment, a single region or more than two regions could instead be used. The discharge of electricity also generates a pair of compression waves in the gas which propagate in opposite directions away from the active regions 4 and which waves each have a width approximately equal to the width of the discharge electrodes 5, i.e. the width of the active regions 4. Although the gas mixture in the preferred embodiment of the Xe Cl laser comprises 2% xenon (Xe) and 0.2% hydrogen chloride (HCl) in a diluent of neon at 4 atmospheres, other combinations of gases, diluents and pressures may be used in the invention. X-ray gun 14 preionizes the gas prior to the discharge of electricity through active region 4.

In FIG. 1, the gas 1 circulates through the device in the direction depicted by arrows 6 so as to flow successively through heat exchangers 7 and the active regions 4 of the device. In operation, the gas within active regions 4 is replaced after each discharge of current by gas coming from, and which has been cooled by, heat exchangers 7.

Figure 3:
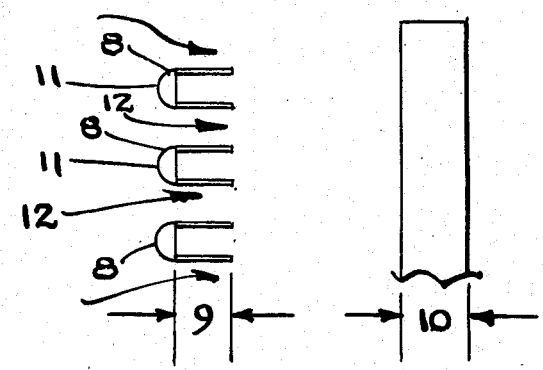
FIG. 3 is a cross-sectional view of a few of the acoustic obstacles.

A number of acoustic obstacles 8, referred to herein as "acoustic diodes", are located upstream of regions 4 as depicted in FIG. 1 within the volume of gas contained by walls 2 and 3. The obstacles 8 are a series of columns running from wall 3 to wall 2 which have cupped-shaped cross sections as depicted in FIG. 3. Also as depicted in FIG. 3, the depth 9 of the cupped portion of the cross-section in the preferred embodiment is approximately the same as the width 10 of the discharge electrode 5. As a consequence, the depth of the cup is approximately the same as the width of the compression wave that is generated by the discharge of electricity between electrodes 5. This depth is optimum for the reflection of the incident waves. The faces 11 of obstacles 8 that are opposite the "cups" have a rounded or more streamlined shape as contrasted to the cupped side of the obstacles. As a consequence of the selection of the depth of the cups and of the streamlined shape of the opposite side of the obstacles, the obstacles 8 interact with the compression wave in the gas that is generated by the discharge of electricity through the gas so as to cause a net flow of gas through the obstacles in the direction indicated by arrows 12 in FIG. 3. In order to cause the gas to circulate through the heat exchanger and the active region, as depicted in FIG. 1, the obstacles 8 depicted in FIG. 1 all are oriented so that the openings of the cups face downstream to the flow of the gas.

Figure 2:
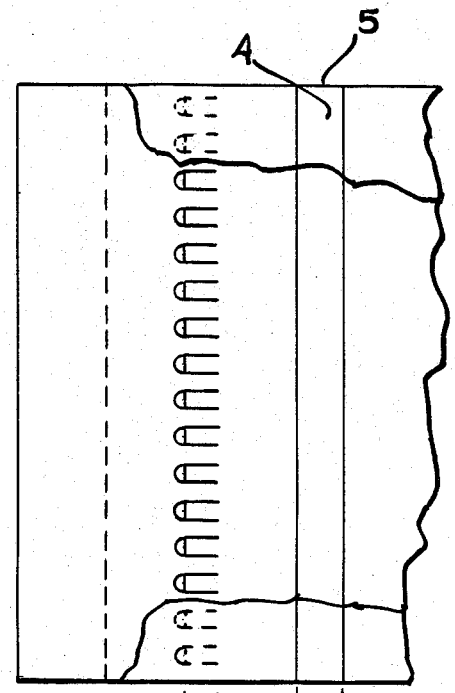
FIG. 2 is a top view of the device which depicts the location of the acoustic obstacles within the upper portion of the device.

Although a cup-shaped cross section is used for the obstacles 8 in the preferred embodiment, other shapes of obstacles could be used instead, so long as the obstacles exhibit an asymmetrical resistance to the passage of the compression waves. FIG. 2 further illustrates the location of the obstacles within the device. The width of the obstacles, the spacing of the obstacles and the distance of the obstacles from the discharge region 4 are selected so that the wakes in the gas flow past of the obstacles combine to produce efficient and a more or less uniform gas flow through the discharge regions 4. In the preferred embodiment, the discharge regions have a cross-section of approximate 4 cm. by 4 cm., the obstacles each have a width of approximately 1 cm. and the center-to-center spacing of the obstacles is approximately 2 cm. with the nearest edge of each row of obstacles being located approximately 10 cm. from the discharge region. In the preferred embodiment, a pulse repetition rate of 20-30 pulses per second produces a circulatory gas flow sufficient to give a flush factor of approximately 2 to 3; that is, the volume of gas flowing through the discharge region within the time between discharges is approximately 2 to 3 times the volume of gas contained within the discharge region.

Figure 4:
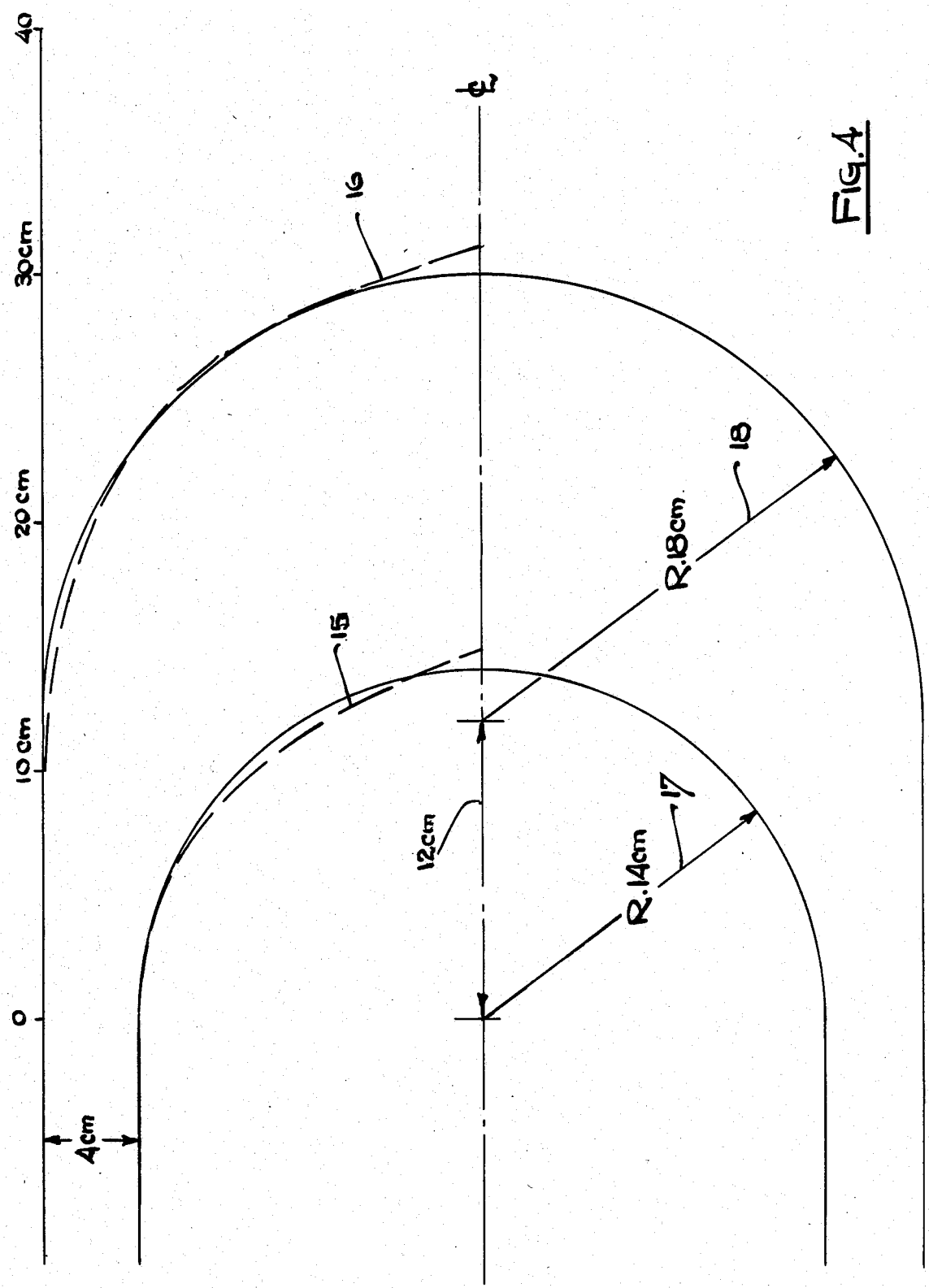
FIG. 4 depicts the shape of a portion of the walls of the gas container which approximate a catenoidal horn in shape.

Referring to FIG. 1, the radius of curvature 13 of inner wall 2 and the radius of curvature 14 of outer wall 3 of the device are selected so as to approximate the shape of a catenoidal horn so as to avoid significant reflection of the compression wave as the wave propagates toward the heat exchanger. FIG. 4 shows catenoidal curves 15 and 16 which are approximated by the curves having the radii of curvature 17 and 18, of 14 and 18 cm. respectively, as depicted in FIG. 4. By selecting the radii of curvature 13 and 14 to be equal to those depicted in FIG. 4 as radii 17 and 18, a low reflective contour for the walls of the device is obtained.

I claim:

1. In a pulsed discharge flowing gas laser for gas circulation including, means defining a loop cavity for containing a laseable gas which can circulate therethrough, means forming at least one electrode pair defining a discharge region through the gas, pulse means for causing a pulsed electrical discharge across said electrode pair which excites lasing action in the volume of gas in said discharge region and also causes a compression wave in the gas, the improvement comprising:

a plurality of cup shaped passive acoustic obstacles, having no moving parts, said acoustic obstacles being positioned upstream from the discharge region, and arranged along a line across the gas flow in said cavity with a width, spacing and location such that wakes of the flowing gas passing through said acoustic obstacles combine to produce a substantially uniform gas flow at the discharge region, each of said acoustic obstacles having an asymmetrical shape so that when said asymmetrical obstacles are placed within the gas flow they exhibit an asymmetrical resistance such that less resistance to passage of the compression wave in one direction as compared to the opposite direction is produced, thereby causing a net flow of said gas in said one direction to circulate through said loop.

2. The device described in claim 1 wherein the acoustic obstacles comprise a plurality of asymmetrical acoustic barriers each having a reentrant-shaped cross section having a concave and a convex surface and forming a cavity, the concave surface of the acoustic barrier facing substantially downstream to the direction of the flow of the gas and the convex surface of the acoustic barrier facing substantially opposite to the direction of the flow of the gas.

3. The device described in claim 2 wherein the depth of the cavity is approximately the same as the width of the compression wave.

4. The device described in claims 1, 2 or 3 wherein the interior volume is bounded by walls having a substantial portion thereof approximating the shape of at least one catenoidal horn.

* * * * *